US009268465B1

(12) United States Patent
Yari (10) Patent No.: US 9,268,465 B1
(45) Date of Patent: Feb. 23, 2016

(54) SOCIAL MEDIA SYSTEM AND METHODS FOR PARENTS

(71) Applicant: Guguly Corporation, Irvine, CA (US)

(72) Inventor: Behzad Yari, Irvine, CA (US)

(73) Assignee: Guguly Corporation, Irvine, CA (US)

( * ) Notice: Subject to any disclaimer, the term of this patent is extended or adjusted under 35 U.S.C. 154(b) by 0 days.

(21) Appl. No.: 14/674,743

(22) Filed: Mar. 31, 2015

(51) Int. Cl.
*G06Q 30/06* (2012.01)
*G06F 3/0482* (2013.01)
*G07C 13/00* (2006.01)
*G06F 3/0481* (2013.01)
*G06F 3/0484* (2013.01)

(52) U.S. Cl.
CPC .......... *G06F 3/0482* (2013.01); *G06F 3/04817* (2013.01); *G06F 3/04842* (2013.01); *G06Q 30/0621* (2013.01); *G06Q 30/0633* (2013.01); *G07C 13/00* (2013.01)

(58) Field of Classification Search
CPC ....................................................... G06Q 50/01
See application file for complete search history.

(56) References Cited

U.S. PATENT DOCUMENTS

| 6,193,518 | B1  |    | 2/2001  | Nocera                          |
|-----------|-----|----|---------|---------------------------------|
| 6,760,721 | B1  | *  | 7/2004  | Chasen ............. G06F 17/30038 |
|           |     |    |         | 715/804                         |
| 7,272,267 | B1  |    | 9/2007  | Nakajima                        |
| 7,472,071 | B2  |    | 12/2008 | Marks et al.                    |
| 7,480,669 | B2  | *  | 1/2009  | Lo ...................... G06F 17/30038 |
|           |     |    |         | 707/999.101                     |
| 8,054,343 | B2  |    | 11/2011 | Cheatle et al.                  |
| 8,660,319 | B2  |    | 2/2014  | Aarabi                          |
| 8,737,815 | B2  |    | 5/2014  | Singer                          |
| 8,793,324 | B1  |    | 7/2014  | Schabes et al.                  |
| 8,805,018 | B2  |    | 8/2014  | Li et al.                       |
| 2002/0087520 | A1 |  | 7/2002  | Meyers                          |
| 2002/0147728 | A1 | * | 10/2002 | Goodman ............. G06F 3/0482 |
|           |     |    |         | 707/999.104                     |
| 2006/0031201 | A1 | * | 2/2006  | Adams ............... G06F 17/30265 |
|           |     |    |         | 707/999.003                     |
| 2006/0036562 | A1 |  | 2/2006  | Wu                              |
| 2009/0113350 | A1 |  | 4/2009  | Hibino et al.                   |
| 2012/0078953 | A1 | * | 3/2012  | Araya ............... G06F 17/30979 |
|           |     |    |         | 707/769                         |
| 2012/0166931 | A1 |  | 6/2012  | Alonso et al.                   |
| 2012/0221559 | A1 | * | 8/2012  | Kidron .............. G06F 17/30867 |
|           |     |    |         | 707/723                         |
| 2012/0317111 | A1 | * | 12/2012 | Desmond .......... G06F 17/30268 |
|           |     |    |         | 707/736                         |
| 2013/0089243 | A1 | * | 4/2013  | Sauve ............... G06F 17/30038 |
|           |     |    |         | 382/118                         |
| 2013/0282486 | A1 | * | 10/2013 | Rahle ...................... G06F 3/048 |
|           |     |    |         | 705/14.53                       |
| 2014/0043329 | A1 |  | 2/2014  | Wang et al.                     |
| 2014/0075004 | A1 |  | 3/2014  | Van Dusen et al.                |
| 2014/0136968 | A1 | * | 5/2014  | Matas ................... G06F 17/211 |
|           |     |    |         | 715/269                         |

(Continued)

OTHER PUBLICATIONS

Hasan, "A User Centric Interface for the Management of Past, Present and Future Events", PhD thesis, University of Trento, Apr. 2011.*

*Primary Examiner* — Jennifer To
*Assistant Examiner* — Joseph R Burwell
(74) *Attorney, Agent, or Firm* — Fish & Tsang LLP (57) ABSTRACT

A system for managing a plurality of child profiles is provided that allows parents of children to capture a child's life events in media files, which are automatically imported into a life album for each child. The system also generates different views for the child's life album based upon both user-generated information and computer-generated information, and allows users to identify favorite media files for review using other tree structures. The system could automatically generate a face transformation video from life album media files, and could automatically generate expert queries from common issues gleaned from community discussions that are summarized and exported to experts for review.

17 Claims, 7 Drawing Sheets

(56) References Cited

U.S. PATENT DOCUMENTS

2014/0181089 A1* 6/2014 Desmond .......... G06F 17/30268 707/722
2014/0185924 A1 7/2014 Cao et al.
2014/0279861 A1* 9/2014 Stonelake .............. G06Q 50/01 707/609
2015/0006523 A1* 1/2015 Das ..................... G06F 17/3002 707/725

* cited by examiner

SOCIAL MEDIA SYSTEM AND METHODS FOR PARENTS

FIELD OF THE INVENTION

The field of the invention, is social media applications.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Many parents wish to document and monitor their child's life well and in detail. Such documentation is especially important before the age of 18, while the parent is still a guardian of the child. With the demands of everyday living, however, it becomes harder to document a child's growth efficiently. Fortunately, many parents now have smart devices that could be used to improve the way parents can document their children's lives.

US 2009/0113350 to Hibino teaches an application that creates a visual summary of a hierarchically structured set of digital objects for facilitating efficient access to such objects through the selection of representative summary objects. Such visual summaries could be organized by year, month, and event information. A user could then choose to view a top level folder node to present a user with a representative visual summary object per year, or delve down to find a media object of choice, such as a digital image file. Hibino's application, however, creates such hierarchical structures automatically by computer-generated capture information such as a creation date, and fails to query users for both user-generated and computer-generated information to create such hierarchical structures.

U.S. Pat. No. 8,793,324 to Schames teaches a system that provides systems and methods for exchanged information in a social media to be organized according to discussion topics. Comments comprise text, but could include additional non-text data, such as a photo, video, or document. All comments in Schames, however, must comprise text with the non-text data. Schames fails to provide ways that a user could provide comments to a discussion topic in a non-text form.

U.S. Pat. No. 8,054,343 to Cheatle teaches a system that assists a user of a device having an image to assist a user of the device to capture subsequent images for a sequence of images that have substantially the same location and device orientation. This allows the system to construct a sequence of images that could be meshed into a video showing changes of an object over time. Cheatle's system, however, fails to automatically identify and construct a sequence of transformations of the object over time by scanning through a library of images.

Thus, there remains a need for a system and method that will allow a user to automatically document and record relevant changes in a child's life.

Summary of the Invention

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a computer system manages a plurality of child profiles.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer-readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The computer system has a non-transitory computer-readable medium with instructions stored on the computer-readable medium, that when executed on a processor perform a series of processes to enable a user of the system to manage a child profile. Users generally interact with the computer system through a user interface, for example a computer screen with a mouse and a keyboard, or a touchscreen of a mobile device, such as a phone or a tablet device. Preferably, the user invokes an application on the mobile device to connect to the computer system and perform tasks to manage one or more child profiles.

In one embodiment, a system could define a life album to a child profile. A user of the system could use a life album user interface to add media files to a child profile. The user could upload, for example, one or more images of the child, one or more videos of the child, and/or one or more text descriptions of the child using the life album user interface. The system would then associate the uploaded media file (or files) with the child profile. Each media file preferably has timestamp metadata associated with it, such as a date and time of when the file was created or uploaded. In some embodiments, the timestamp metadata could be defined by a user through the life album user interface. Each media file associated with a child profile is preferably stored by the system on a portion of the memory. In the case of a life album, the media files associated with the child's profile is generally referred to as the life album memory.

The computer system could also be configured to automatically organize the media files in accordance with metadata associated with the media files. Preferably, the system uses the timestamp metadata, and organizes the media files in accordance to one or more time categories. For example, a media file could have a year time category, season time category, month time category, day time category, hour time category, minute time category, and/or any other type of time category that is used to categorize the media file. Media files could also be placed in categories by a user of the system. For example, the life album user interface could be configured to ask a user for a category, such as an event name for a portion of the media files saved in the life album memory of the child profile.

Once one or more categories have been assigned to a set of media files in the life album memory, the system could generate a life album tree structure for the media files as a function of the categories. For example, from the root of the tree, a first level could be the year assigned to the media file, the second level could be the month assigned to the media file, a third level could be the name of an event assigned to the media file, and a fourth level could be the type of the media file (e.g. an image file or a video file). The automatically generated tree preferably has at least three levels, and uses a combination of automatically generated categories (e.g. time categories, file type categories) and user-defined categories (e.g. event name category, event type category) from which to build the tree. Each media file generally represents a leaf on the tree, being a final destination for a user perusing a life album through a life album user interface.

The life album tree structure is generally provided to the user through the life album user interface. In some embodiments, the tree structure is provided as a navigable tree from root to leaf. In other embodiments, the tree structure is provided one level at a time, allowing a user to navigate from one tree junction to another tree junction like a user of a computer navigates through a directory tree from folder to folder. A user navigates a path to one or more leaves of the tree (generally a media file) by issuing a set of commands from the life album user interface to find one or more media files. Each child profile generally has its own life album tree, and a user could navigate to different leafs on different child profiles to view media files associated with each child profile. When the user finds a media file, the user could view the media file and can also associate additional content with the media file.

For example, the system could profile an input comment field to life album user interface that a user could use to create a comment for any of the media files. The input comment field is preferably configured to receive a comment in different forms. For example, a user might use the same input comment field to add a video comment (such as a video recorded by a camera on the device) an audio comment (such as an audio stream recorded by a microphone on the device) or a text comment (such as a text stream recorded by a keyboard user interface on the device). In some embodiments, a single comment might have several different forms (e.g. a single comment with a video stream, audio stream, and a box of text). When the system receives a comment in any form, the system preferably then associates the comment with the media file, and displays that comment to a user who has navigated to the media file, allowing a user viewing the media file to see that one or more comments are associated with the media file.

The life album user interface could also provide a user with a toggle specific to each media file, allowing the user to toggle whether or not the media file is a favorite media file of the user. If the user activates the toggle via a favorite toggle command, the system registers that an account associated with the user has marked the media file as a favorite of the user. When a user wishes to view his/her own favorite media files, the user could then navigate to a favorites user interface.

The system preferably generates a favorites album tree structure as a function of the media files that have their "favorite toggle" activated. The favorites tree structure preferably has at least two levels, where each media file is a leaf in the tree structure. In one embodiment, the tree structure could be configured to have identifiers of child profiles as nodes in the first level, and identifiers of the toggled media files in the second level. The favorites album tree structure is simpler than the life album tree structure, simplifying the media files into categories for each child profile. When a user navigates to a leaf of the tree structure, the user could then view any added comments that have been associated with the media file. Finalized favorites album tree structures could be displayed in a favorites user interface in ally appropriate manner.

The system could also provide a modeling user interface that enables a user to provide one or more media files saved in the life album memory to a modeling agency for use in an advertisement, or some other purpose. The system provides a modeling user interface that allows a user to select a media file from the life album memory and send a request to the system to transmit the first media file to a distal modeling computer system. The system then transmits the selected media file to the distal modeling computer system for review. The distal modeling computer system generally has its own user interface that authorized modeling agencies use to review the sent media file, and decide whether or not to license the media file for use. The modeling agency could then transmit a purchase order (generally for a license to the media file) to the computer system that manages the life album. A user could then decide whether or not to accept the purchase order through the modeling user interface and, if accepted, the system could debit an account as a function of the purchase order (typically through a credit/debit account identified in the purchase order), and transmit a license to a modeling entity as a function of the purchase order (the modeling entity is typically also identified in the purchase order).

The system is also configured to transmit one or more media files to a competition entity for review in one or more competitions. The system provides a competition user interface to a user that allows that user to select one or more media files as an entry to a competition. Preferably the system is set up such that only one media file saved in a child profile life album can be selected at a time, for example by associating a child profile unique identifier with a media file entry, and preventing additional media files from being saved with the same unique identifier. The system could then save the selected media file to a competition database functionally coupled with the system, where the competition database has a plurality of competition media files, generally from other child profiles or even submitted from other systems. The plurality of competition media files now include the sent media file.

The system could then provide the plurality of competition media files to a plurality of other competition user interfaces as entrants to the competition, allowing each competition user interface to vote for one or more of the media files. Preferably, the system is configured such that each user of the system can only cast a single vote for the duration of the competition. A competition duration might be for a specified period of time, or might last so long as the system is online. In some embodiments, a media file entry could be entered in a plurality of competitions, such as a weekly competition, a monthly competition, and a yearly competition. For each competition, the system preferably receives a plurality of votes and calculates a tally for each of the competition media files. At the end of a competition, the system could then provide an indicator of a winner of the competition to the competition user interface. The winner indicator is generally calculated as a function of the tally of votes for the media files. In some embodiments, multiple indicators could be used for multiple winners, for example a first place winner, second place winner, or a third place winner.

The system is preferably also configured to render a face transformation video of a child in a child profile. Since a life album of a child profile generally contains photos from throughout the child's life, the system could be configured to compile a video from the various photos that show how a face of the child has matured over time. The system generally presents a face transformation user interface to a user, and receives a command from the user to generate the face transformation video. The system then generally selects two or more facial images from the media files as a function of their timestamp metadata.

Where a media file is an image, the system could be configured to select the image itself as the facial image, or could be configured to automatically crop the image around a face. Where the media file is a video media file, the system could be configured to separate the video media file into a plurality of images for review. Generally, each facial image is selected from a different time period, for example a first facial image could be selected from the month of January while the second facial image could be selected from the month of February. Such time periods could be predefined by the system, or could be defined by a user through the face transformation user interface. The system could be configured to look at all images derived from media files within a time period, derive a facial clarity value for each of the images, and then select an image as a function of its derived facial clarity value. In some embodiments, the system could be configured to recognize features of a child profile face by identifying features of the child profile face in an image associated with the child profile (for example a main child profile photo selected by a user), and could filter out images that fail to contain a subset of the features of the child profile face by comparing the identified features against each of the available images, or against the media files directly.

Preferably, the system automatically selects an image with the highest facial clarity value. In some embodiments, where a user wishes more direct control over the process, the system could be configured to show a user all of the image files derived from media files within each time period through the face transformation user interface, and the user then picks an image from each of the presented sets of image files. Preferably, the system will rank the facial images by facial clarity value, presenting the user with facial images with the highest facial clarity first, and with facial images with the lowest facial clarity last. In some embodiments, the system could select a subset of the images having a derived facial clarity value above a predefined threshold facial clarity value, such as 60% clarity, 70% clarity, 80% clarity, or 90% clarity, and could provide that subset to a face transformation user interface for selection by a user.

Once the system has selected a set of facial images to construct the video from, the system can derive a set of facial features for each facial image, and generates a face transformation video containing each of the facial images that aligns the facial images with one another in the video as a function of the facial features. For example, the system could align a centerline of each face with a centerline of the video, or could align the images such that they all have overlapping nose locations, or could rotate the image so that all of the images have a same facial angle. The system could save the face transformation video to a face transformation memory location and present the video to the face transformation user interface.

Users of the system frequently collaborate with one another to discuss issues, such as issues with a child of a child profile. The system could provide a parental collaboration user interface that allows users to send a comment generation request to the system to generate a comment thread. Users of the system (generally parents) could then send comments to the comment thread, which are then saved in the comment thread. A comment thread generally contains comments from different users of different child profiles. For example, a first user of a first child profile could provide a comment to a comment thread, and a second user of a second child profile could provide a different comment to the same comment thread. A comment could comprise any sort of media content, for example text, audio, and/or video content. As used herein, video content comprises an audio component and a video component.

Once at least two comments have been saved to a comment thread, the system could be configured to automatically detect a common issue between the plurality of comments saved to the comment thread. Where a comment thread comprises a plurality of different types of media content, the system generally converts all media content to text content before automatically detecting a common issue between the plurality of comments. Where media content is text content, no conversion is necessary. Where media content is audio content, the system could use known speech recognition algorithms to convert audio content to text content. Where the media content is video content, the system could use known speech recognition patterns to convert the audio component of the video content to text content. Once the media content has been converted to text content, the comment thread has a set of text content from which the system could derive a common issue.

In some embodiments, the system derives a common issue by detecting recurring phrases from the plurality of comments. The system could be configured to only detect recurring phrases of a minimum length, such as three words, four words, five words, eight words, or 10 words, and/or the system could be configured to only detect recurring phrases from unquoted sections of a comment. As used herein, a "quoted" section of a comment is a section of a comment that quotes a previously saved comment in the comment thread, while an "unquoted" section of a comment is a section of a comment that does not quote a previously saved comment in the comment thread (i.e. the "original" section of the comment) The system could also be configured to detect whether an unquoted phrase has two or more literal phrase equivalents. As used herein, a "literal phrase equivalent" of a phrase is another phrase that is considered to be equivalent to a detected phrase. For example the phrase, "a child with a broken leg" could be considered an equivalent to the phrases "a boy with a broken leg" and "a girl with a broken leg," or the phrase "a mentally challenged child" could be considered equivalent to the phrase "a mentally handicapped boy." Such phrase equivalents would be considered by the system to be the same recurring phrase.

In some embodiments, the system could be configured to detect a plurality of common issues. For example, a comment thread might discuss problems with mentally handicapped children, problems with autistic children, and problems with children having ADHD. In such embodiments, the system might rank the many common issues into a ranked list sorted by the number of recurrences—having the most common issues at the top of the list and the least common issues at the bottom of the list. In some embodiments, a user of the parental collaboration user interface might highlight a phrase and send a notification to the system informing the system that the highlighted phrase is a potential common issue. The potential common issue could then be automatically added as a first instance of a recurring phrase, and the system could then automatically detect how many instances that recurring phrase has been used in the comment thread. In some embodiments, a user of the parental collaboration user interface might even identify literal phrase equivalents, allowing users to "teach" a system about new common issues and new literal phrase equivalents.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The term "functionally coupled to" refers to computer devices that are coupled with one another through a network in a manner such that electronic information is transmitted to and from the computer devices.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as as shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements of embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including improving the speed at which media files are organized in a tree structure by automatically creating part of a tree structure and seeking manual input the create the other part of the tree structure, providing comment fields for media tiles that could accept more than just text.

The inventive subject matter provides apparatus, systems, and methods in which a computer system manages a plurality of child profiles.

Figure 1:
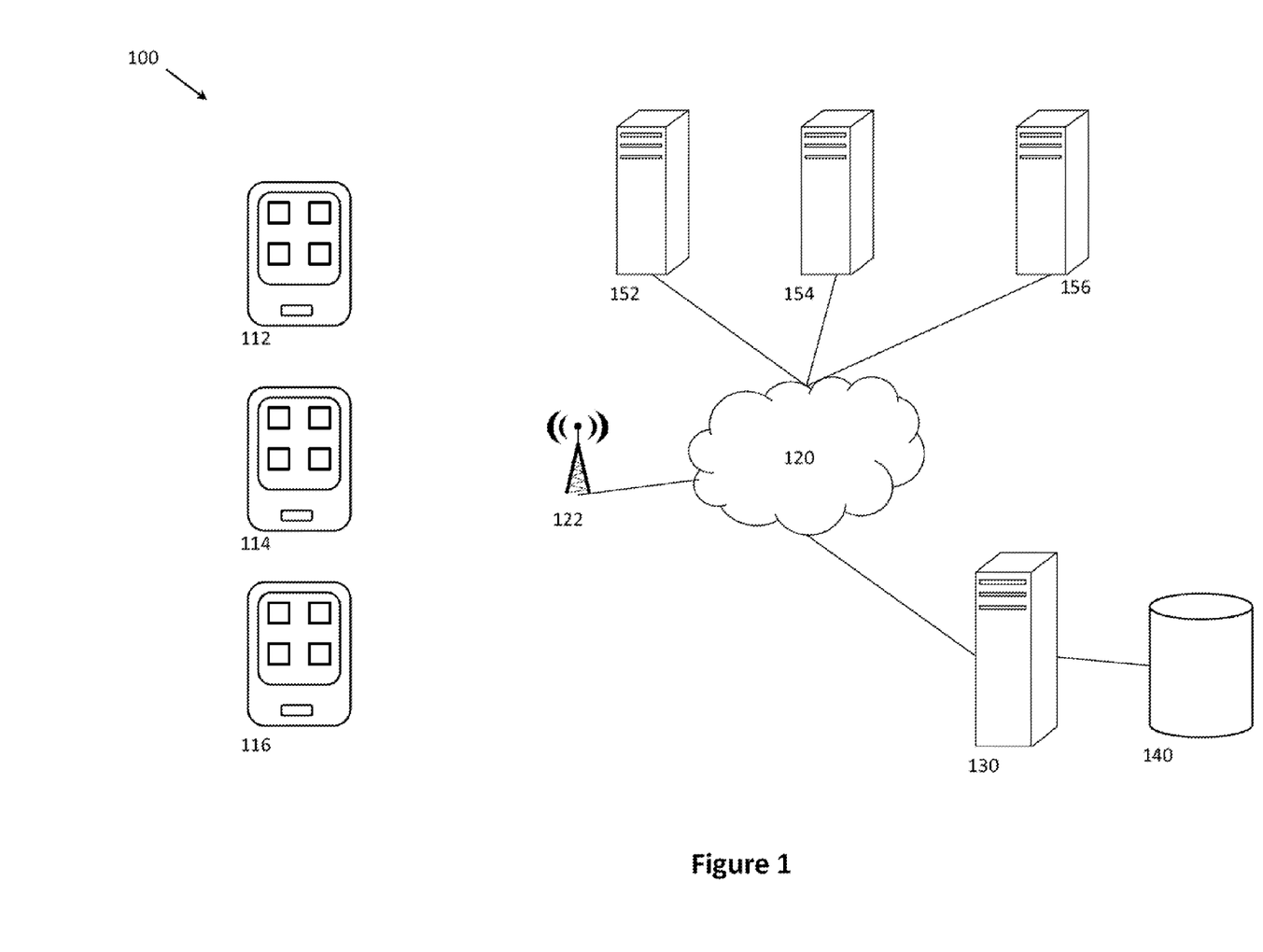
Fig. 1 is a hardware schematic of a system of the current invention.

In FIG. 1, a system 100 has a plurality of user interface modules 112, 114, 116 wirelessly connected to a network 120 through wireless interface 122. These user interface modules 112, 114, and 116 communicate with child profile computer system 130 having storage 140, which also communicates with computer systems 152, 154, and 156. User interface modules 112, 114, and 116 are shown euphemistically has portable phones with touch-screen interfaces, but could be any computer system having a user interface without departing from the scope of the current invention, such as tablet devices, desktop computers, and PDAs. While each of the user interface modules 112, 114, and 116 have a user interface of a touch-screen, speaker, and microphone, user interface modules 112, 114, and/or 116 could have other user interfaces without departing from the scope of the current invention, such as keyboards, mice, trackballs, and controllers. While each of the user interface modules 112, 114, and 116 are shown as being wirelessly connected to network 120 through a wireless connection to wireless antenna 122, the user interface modules could be functionally coupled to network 120 in any wired or wireless manner sufficient to transmit content electronically between the user interface modules and child profile computer system 130.

Network 120 is shown euphemistically as a cloud that functions to connect a plurality of computer systems with one another. Network 120 could be an intranet network, and is preferably the Internet, allowing the connected computer system devices to connect not only with one another, but with all other computer system devices having access to the Internet.

Child profile computer system 130 has a processor configured to execute instructions saved on a computer-readable medium. While child profile computer system 130 is shown as a single computer, child profile computer system 130 could be distributed between a plurality of computer systems in a plurality of different locations, all functionally connected through wired and/or wireless connections, without departing from the scope of the current invention. In a preferred embodiment, child profile computer system 130 is embodied on a plurality of blade servers distributed among a plurality of locations that act as redundant fail-safes in case one or more blades fail. Storage 140 is a non-transitory computer-readable medium accessible by child profile computer system 130, and acts as a storage unit for storing organized information by child profile computer system 130. Like child profile computer system 130, storage 140 could be distributed among a plurality of systems, and distributed among a plurality of locations, so as to act as redundant fail-safes in case one or more storage devices fail.

Distal computer system 152, 154, and 156 are other computer systems that are functionally connected to child profile computer system 130. Child profile computer system 130 communicates with such distal computer systems in order to accomplish cooperative tasks. For example, distal computer system 152 could be a distal modeling computer system that child profile computer system 130 could transmit a media file to. Distal computer system 154 could be a remote transaction server, such as a bank or a middleman such as Paypal®, that child profile computer system 130 could communicate with in order to conduct a transaction. Distal computer system 156 could be a remote social media server, such as Facebook® or Instagram®, that child profile computer system 130 could communicate with in order to send and receive media content, such as photos and videos. Child profile computer system 130 could be configured to communicate with other computer systems through network 120 without departing from the scope of the current invention. The functions of child profile computer system 130 are further elucidated by analyzing the software modules instantiated when its processor executes software instructions stored on its computer-readable medium.

Figure 2:
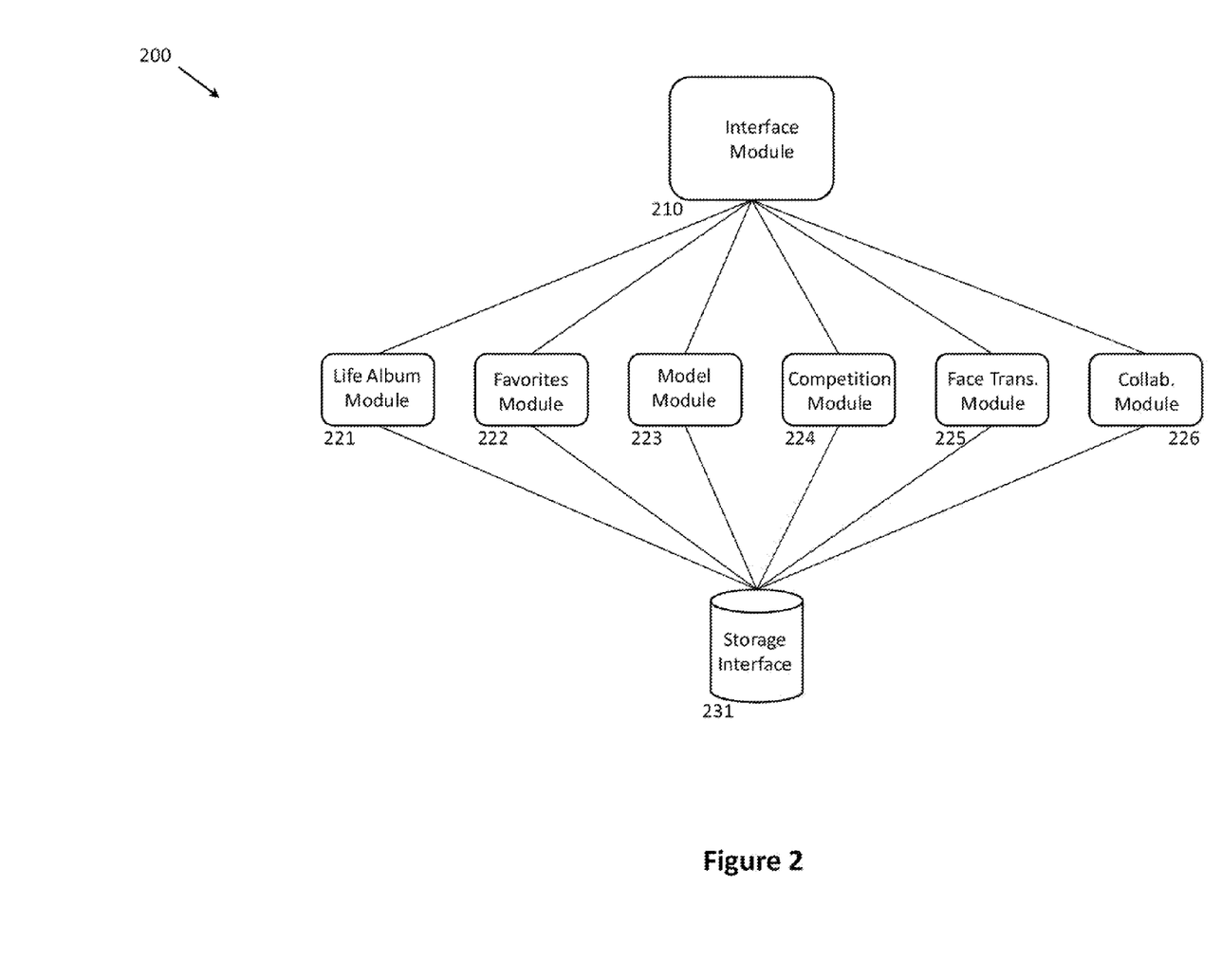
FIG. 2 is a software schematic of a system of the current invention.

In FIG. 2, a software schematic 200 shows various software modules of child profile computer system 130. Child profile computer system 130 has an interface module 210 which communicates with other computer systems via network 120 through known means, such as through a TCP/IP network connection through the Internet. The various systems that interface module 210 sends and receives electronic information to include, for example, distal user interface computer systems, distal modeling computer systems, distal social media computer systems, distal transaction computer systems, distal licensing computer systems, and distal competition computer systems. Child profile computer system 130 also has various modules, such as life album module 221, favorites module 222, model module 223, competition module 224, face transformation module 225, and collaboration module 226. Each of these modules communicates with other computer system through interface module 210, and sends and receives information to storage interface 231. Storage interface 231 could comprise a local non-transitory storage medium within computer system 130, or could comprise an interface with storage 140, but is preferably a combination of both, holding short-term information temporarily in local memory and long-term information for extended periods of time in storage 140. Each module performs tasks on behalf of users and administrators to manage a plurality of child profiles.

Figure 3:
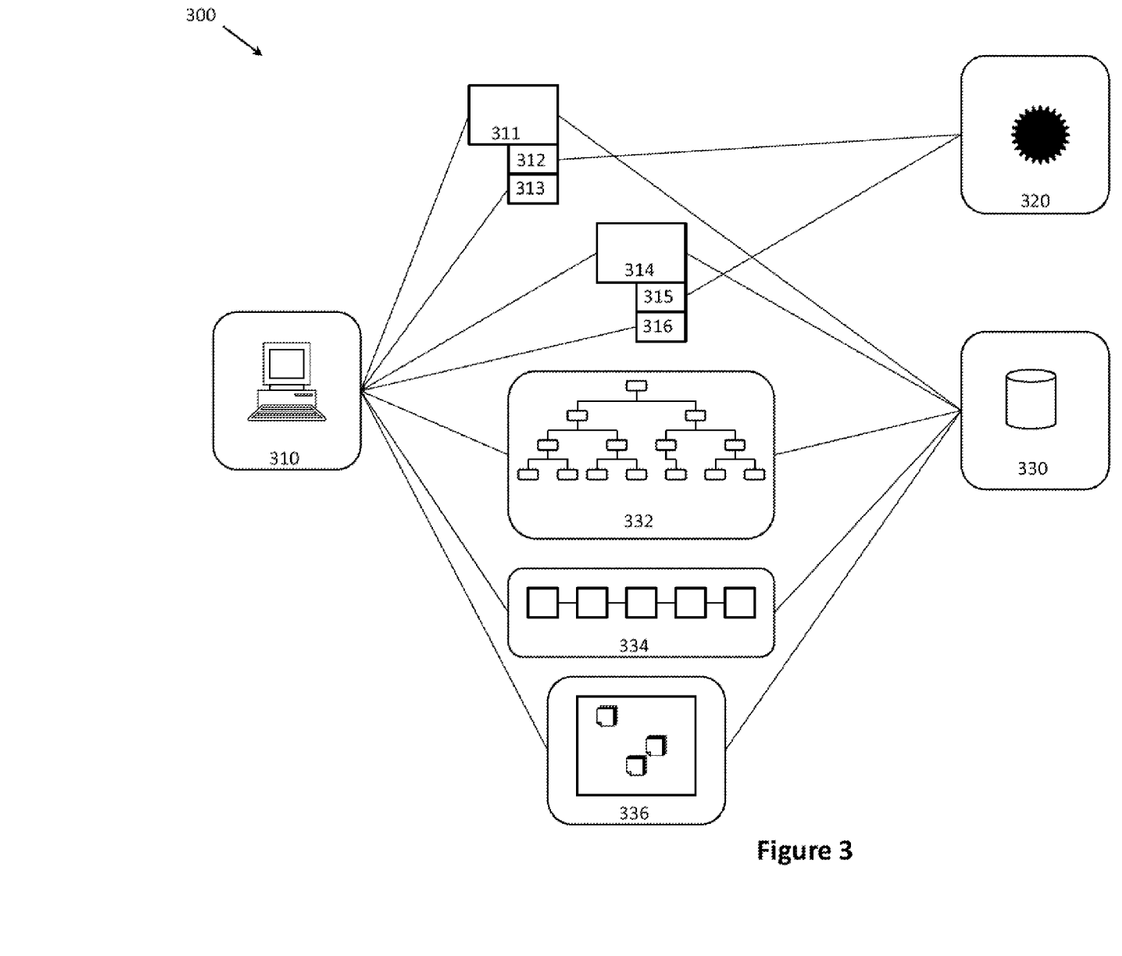
FIG. 3 is software schematic showing component elements of a life album module.

In FIG. 3, a software schematic 300 for a life album module, such as life album module 310, has a computer interface connection 310, a storage interface 330, and a media file metadata generator 320. Computer interface connection 310 communicates with interface module 210 to request media files from a distal user interface, such as a user interface on distal computer system 152. For example, interface connection 310 could provide a button to a life album user interface that allows a user to transmit a photograph taken from a camera on the distal computer system, or a video taken from a camera and a speaker on the distal computer system, to the child profile computer system, or could allow a user of the distal computer system to select a locally saved media file from a library of media files for transmission to the child profile computer system. Such media files could comprise metadata, such as a time that the media file was taken, a location the media file was taken, a format, a resolution, and an identifier of an entity who took the media file. Media files include image files containing graphical data, audio files containing audio data. and video files containing both graphical and audio data.

Such media files, such as media files 311 and media files 314, could then be received by interface connection 310 from the life album user interface. Media files 311 and 314 could be analyzed by metadata generator 320 to derive computer-generated metadata 312 and 315, respectively, that could be used to organize media files 311 and 314. As used herein, "computer-generated metadata" comprises metadata automatically generated by a module of the child profile computer system, such as metadata generator 320, by analyzing properties of files. Such computer-generated metadata could be, for example, a year associated with the media file, a month associated with the media file, a day associated with the media file, an hour associated with the media file, a location associated with the media file, a media file type, and/or a unique identifier associated with the media file. Interface connection 310 could also be configured to request and/or receive user-generated metadata 313 for media file 311 and user-generated metadata 316 for media file 314. As used herein, "user generated metadata" comprises metadata generated by a human user and sent to the child profile computer system through a user interface. Such user generated metadata could comprise, for example, a name of an event that is associated with a plurality of media files to group them all together, a description of a media file, a link to an associated media file, and/or a link to an associated child profile.

In some embodiments, metadata generator 320 also analyzes the media file to determine which life album, or albums, the media file should be imported into. For example, a facial recognition algorithm—such as those disclosed in U.S. 2014/0096018 to Iannucci or US 2013/0027569 to Parulski, both of which are incorporated herein by reference—could be used to recognize a child in an image or video and automatically associate that media file with a particular life album. In some embodiments, the life album user interface could prompt a user if the user wishes to import the media file into a plurality of child profile life albums, such as when a plurality of known children are found in the same image. For such a facial recognition system to recognize a child, a user preferably selects one or more uploaded images as an "identifying image" for a child's life album. Since the facial features of a child tend to change dramatically within the first few years of a child's life, the system preferably prompts a parent to upload an identifying photo more frequently during the first few months of a child's life than during later years of a child's life. For example, where a child is less than a year old, the system preferably prompts a parent to provide an identifying image for the child once per month. However, where a child is between the ages of two and five, the system preferably prompts a parent to provide an identifying image once every 6 months, and where a child is between the ages of five and twelve, the system preferably prompts a parent to provide an identifying image once every year.

Media file manager 330 saves media tiles 311 and 314 having associated computer-generated metadata 312 and 315, respectively, and associated user-generated metadata 313 and 316, respectively, into a computer-readable storage medium for future access, such as storage 140. Media file manager 330 could also organize the media files into various views to present to a user interface via interface connection 310. For example media file manager 332 could organize the media files into a tree structure such as tree structure 332, which is generated as a function of both computer-generated metadata and user-generated metadata. Generally, the upper levels of the tree structure closest to the root are organized using computer-generated metadata and the lower levels of the tree structure closest to the leaves are organized using user-generated metadata. For example, the first level might organize media files by year, the second level might organize media files by month, and the third level might organize media files by event name. In another embodiment, the first level might organize media files by year, the second level might organize media files by month, the third level might organize media files by an event name, and the fourth level might organize media files by the media type.

Media file manager 332 could also organize media files into a linear slide structure such as slide structure 334, allowing a user to view photos and/or videos by sliding a view of a media file left or right along a user interface. Media file manager 332 could also organize media files into a map view that shows a map, and allows a user to navigate through portions of the map in order to determine what media files were taken in certain locations. The map view could also be organized in a tree form, where the top level shows states, a middle level shows cities, and a lowest level shows an intersection. Generally, where a location is based upon a coordinate system, the levels of a map view might be delineated by a zoom level, where a zoom of 1 (the largest view of the map) is a first level, a zoom of 2 is a second level, and so on until there exists only a single location—within that location being a collection of media files organized within an event name, and possibly media file type.

A user could send a request for a type of organization structure through interface module 310, and media file manager 332 could then provide a view of an organization structure, such as tree structure 332. The user could then send a series of life album commands to navigate through the structure, such as selecting the left branch, then the right branch, and then a left branch, to reach a leaf of the tree, which represents a media file. The user could then view the media file through a life album user interface. Preferably, the interface module 310 provides ways for a user viewing the media file to add additional user-generated metadata that is associated with the media file. For example interface module 310 provides an input comment field that accepts any of text content, audio content, and/or video content, or could provide a toggle that allows a user to mark that the media file is one of the user's "favorite" media file. A comment could be of any media content type, such as text content, audio content, or video content. As used herein, video content could be in the form of a series of images, or could be in the form of a series of images with concurrent audio content. Such comments could be saved in memory and associated with the media file such that a user who views a media file can view the comments, whether the comments be text, audio, or video.

A user could also add a favorite toggle to a media file to mark the media file as one of the user's favorite media files. The system would then associate the media file with the user's account as a favorite media file, which could then be displayed by favorites module 222.

Figure 4:
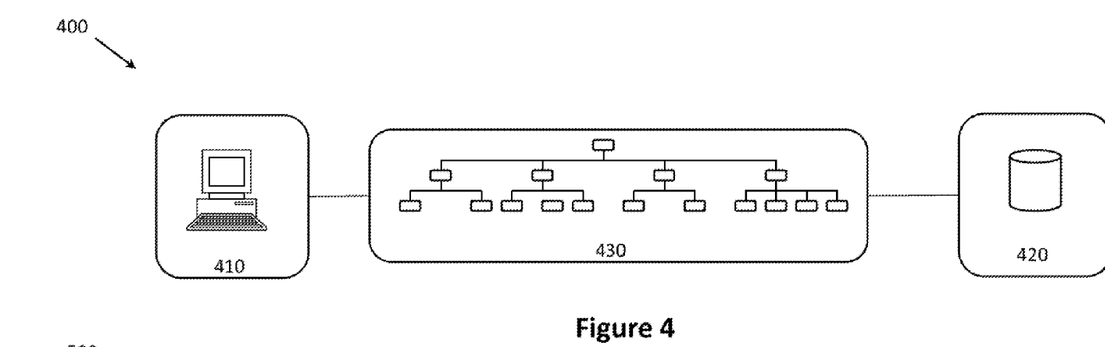
FIG. 4 is a software schematic showing component elements of a favorites module.

In FIG. 4, a software schematic 400 for a favorites module, such as my favorites module 320, has a computer interface connection 410 and a storage interface 420. Interface connection 410 communicates with user interface connections, such as through interface module 210, to provide an opportunity for a user to review his/her own favorite media files. When interface connection 410 receives a request to view a user's favorite media files, the favorites module constructs a tree through storage interface 420. Storage interface 420 searches through its memory to find media files that have been toggled as favorites of a user. Preferably, the memory holds a list of identifiers for each user account, where each identifier is a unique identifier for a media file saved in storage, such as a pointer, to find the set of favorites toggled media files. Storage interface could then construct a favorites album tree structure as a function of the set of favorite toggled media files. The tree structure could be at least two levels, three levels, or so on. In some embodiments, the storage interface could construct the favorites album tree structure as a function of both the user-generated metadata and the computer-generated metadata. For example, at the first level, the storage interface could divide the media files into media files for a first child profile and a second child profile, and at the second level the storage interface could divide the media files into event names. In some embodiments the storage interface could merely place the favorite items into large buckets, where each bucket is a child profile. Preferably, the storage interface has a tree structure where the first level provides an identifier of the child profile that the media files belong to, the second level provides an identifier of a time period, such as a month, the third level provides an identifier of an event name, and the fourth level provides an identifier of the media file. Any comments made by users are preferably displayed along with the media file to the user interface.

Figure 5:
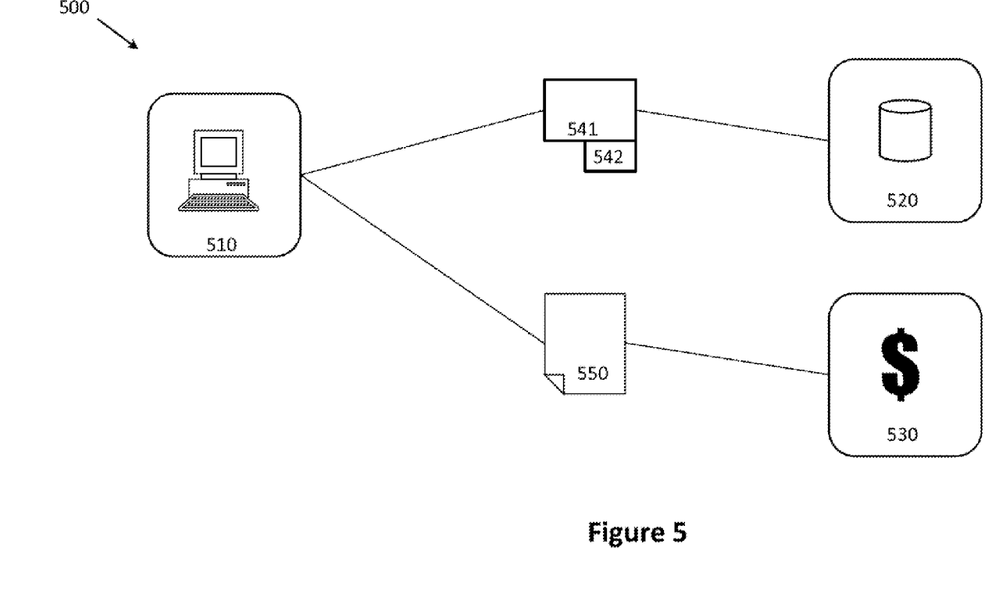
FIG. 5 is a software schematic showing component elements of a model module.

In FIG. 5, a software schematic 500 for a model module, such as model module 330, has a computer interface connection 510, a storage interface 520, and a transaction interface 530. Interface connection 620 could present a modeling user interface, preferably via an interface module such as interface module 210, that allows a user to select one or more media files through storage interface 520. The user interface could allow the user to select the media file through any sort of browsing structure, such as the tree, slide, or map views of the life album user interface, or the my favorites view of the favorites user interface. Once the user selected the media file, the user could also select a modeling agency from a list of modeling agencies provided to the user interface by the model module. The media file 541 would likely be sent with some metadata 542 that is associated with the media file, such as a unique identifier of the media file, an identifier of the child profile associated with the media file, an identifier of the user sending the media file, an identifier of one or more parents or guardians associated with the child profile, and/or a type of licensing contract. Once the media file has been sent to the modeling agency's computer system via computer interface connection 510, the modeling agency could peruse the media file and determine whether or not it wishes to license the media file.

If the modeling agency decides to license the file, the modeling agency could then transmit a request for a license to computer interface connection 510 with an offer of a contract 550. This contract could be sent to the parent or guardian of the child by using an identifier in metadata 542. The parent or guardian could then digitally sign contract 550, and transaction module 530 would then transmit funds, credits, or other units of value from an account associated with the modeling agency to an account associated with the parent or guardian, and would transfer a digital license to the modeling agency through interface connection 510.

Figure 6:
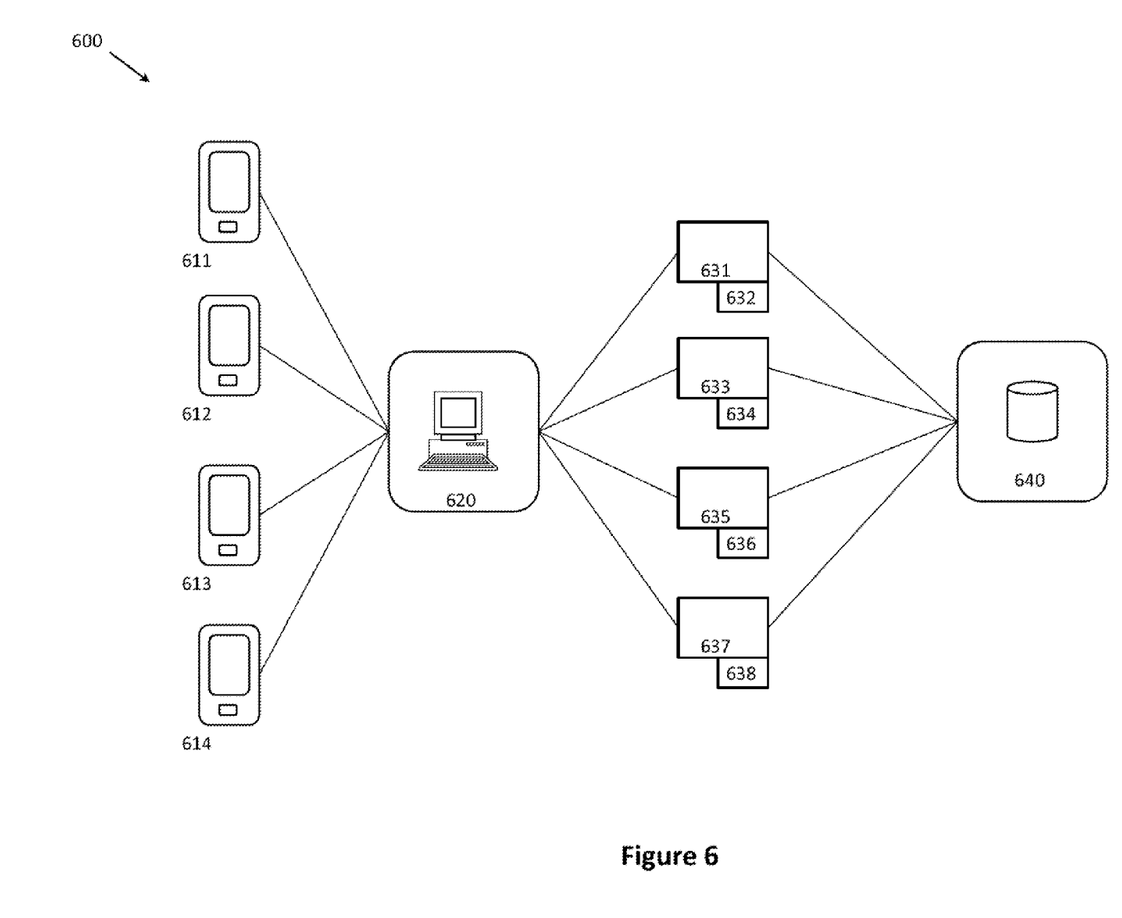
FIG. 6 is a software schematic showing component elements of a competition module

In FIG. 6, a software schematic 600 for a competition module, such as competition module 340, has a computer interface connection 620, and a storage interface 640. Computer interface connection 620 generally communicates with a plurality of different user interfaces 611, 612, 613, and 614, possibly through an interface module such as interface module 210. A user of the interface module could send a command through the provided competition user interface to send a selected media file as an entry to a competition. Preferably, the system is configured such that each user account is allowed to submit only one media file at a time. Such functionality could be achieved, for example, by setting up the system such that when a user tries to submit a second media file to a competition, the system either refuses to submit the second media file, or supplants the first submitted media file with the second media file. The system could provide a competition user interface to a user that allows the user to peruse through media files that the user has access to, such as through a life album browsing structure or my favorites browsing structure, and select a media file to submit as a competition entry.

Software schematic 600 shows various media files 631, 633, 635, and 637 which have been selected by different users as entries to a competition. These media files are compiled and shown to various user interfaces, such as user interfaces 611, 612, 613, and 614 via computer interface connection 620 to allow the user interfaces to vote on a media file. Preferably, the system is set up such that each user account is only allowed to vote once for a competition. At the end of a competition (i.e. when a month has passed for a monthly competition, or when a year has passed for a yearly competition), the system could tally the number of votes for each of the media files entered into the competition, and provide an indicator to at least one of the competition user interfaces regarding which media file is the winner of the competition. The indicator is generally calculated as a function of each of the tally of votes.

Figure 7:
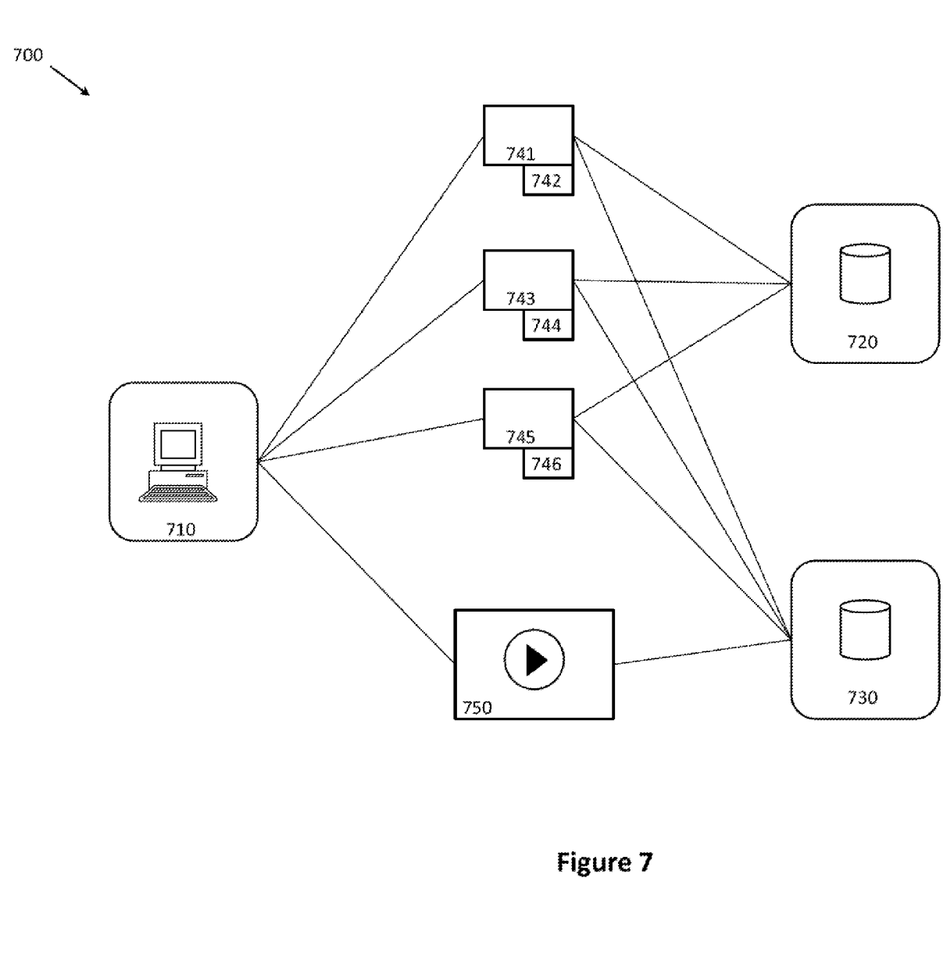
FIG. 7 is a software schematic showing component elements of a face transformation module.

In FIG. 7, a software schematic 700 for a face transformation module, such as face transformation module 350, has a computer interface connection 710, a media file storage interface 720, and a video storage interface 730. The computer interface connection 710 generally is configured to present a face transformation user interface to a user via computer interface connection 710. Through the face transformation user interface, a user could select a series of photos in a life album from which a face transformation video could be constructed. In a preferred embodiment, the system will automate this process by selecting the most relevant photos available to construct a face transformation video.

In some embodiments, a user will send a command through the face transformation user interface that the user wishes to construct a face transformation video from a child's life album. This is generally performed by a parental user who selects a button such as "generate face transformation video" and then selects one of the parental user's children. Since each child is generally associated with a different life album, the system could then peruse through the life album for valid media files that could be used to generate a face transformation video.

The system generally has a default algorithm that could be used to generate a face transformation video. For example, a default algorithm could be a system that automatically selects the most appropriate image from every month, every week, or every day in a life album to construct a face transformation video. In some embodiments, the system could be configured to display, via the face transformation user interface, some of the default settings and allow a user to change a setting. For example, the face transformation user interface could reveal to the user that default settings automatically select the most appropriate photo from every week of available photos in a life album, and construct a video based upon those most appropriate photos. A user could then alter the default settings to automatically select a photo within every 30 day time period, every 15 day time period, every 10 day time period, every 5 day time period, every 3 day time period, or every day. Where a time period (such as a month, week, or day) in the life album does not have any photos, the system could skip that photo.

The system could be configured to select the most appropriate photo within a time period of the life album using a variety of different techniques. For example, the system could derive a facial clarify value for each of the images in a time period (including images within a video media file), and select the image having the highest facial clarity value for a face that matches an identifying image for the life album. Images that fail to have a face that matches the identifying image for the life album are generally not considered as candidate images by the face transformation module. As used herein, a "facial clarity value" is a metric measured from 0 to 100 that reflects how much of a face is shown in an image. For example, an image showing only the back of a person's head would have a facial clarity value of 0, an image showing the profile of a person might have a facial clarity value of 20, and an image showing a plan view of a person's face might have a facial clarity value of 100. A simple facial clarity algorithm might identify a number of identifying features in the life profile's identifying image, divide 100 by that number to get a value x, and then add x to the facial clarity value for every identifying feature found in an image. A more robust facial clarity algorithm might weight the facial clarity value by feature importance. For example an identifying nose, mouth, and eyes might have twice as much weight as an identifying cheek, mole, and ears for a face. In a preferred embodiment, the system would automatically select an image having the highest facial clarity value within a time period. Where a plurality of images have the highest facial clarity value within the time period, the system preferably selects the most recent image taken.

In some embodiments, the user might alter the defaults such that the user is able to select the images used in the face transformation video. Preferably, for each time period, the system provides the user with a list of images having a derived facial clarity value above a predefined threshold facial clarity value, such as 70 or 80. The system could rank each of the presented images, such that the images having the highest facial clarity value are presented higher in the list before the images having a lower facial clarity value. The user could then select an image from each presented set of images for each time period, selecting a plurality of images to be used for the resultant face transformation video.

Once the images are selected (either automatically or through manual selection by the user), the system preferably aligns each of the images with one another as a function of the facial features detected in each image. For example, the system could detect a centerline of each face, and orient all of the images such that the centerlines of each face in each image aligns with a centerline of the video. Or the system could detect an area of each image that has a nose, and align the images such that each nose location overlaps the location of the next and/or previous images nose location. Or the system could detect an angle of the face in each image, and ensure that all of the angles of the face in all of the images match one another. In a preferred embodiment, the system could provide an interface to the face transformation user interface allowing a user to manipulate an angle and a size of the face in the first image of the face transformation video, and the system could then ensure that all of the later faces in the face transformation video are aligned with the manipulated first image.

In some embodiments, the system could zoom in or zoom out on a face to ensure that the face in each image is within a threshold volume. For example, the system could set the face transformation video to ensure that an area of a face in each image is within 70-80% of the total area of an image. Where an image is used having a face below the threshold percentage gap, the system could zoom in on the face until the face has an area at least the area of the lowermost threshold percentage. Where an image is used having a face above the threshold percentage gap, the system could zoom out on the face until the face has an area at most the area of the higher threshold percentage. Contemplated threshold sizes also include exact thresholds, for example a threshold ensuring that the area of every face in a face transformation video has an area of 75% of the total size of the image.

The selected and aligned images are then combined by the module into a video 750. Here, the selected images are 741, 743, and 745 with associated metadata 742, 744, and 746, respectively. The metadata associated with each image comprises, for example, a timestamp associated with the image, a facial clarity, whether the image was selected for use in a face transformation video, and how the image has been rotated, zoomed, and/or cropped in order to be aligned with the other images in the video. The video is then stored into the memory via video storage module 730, which generally saves the video in a separate part of memory than the life album storage. Video storage module 730 also saves each selected image and metadata associated with each image. In the future, when a user wishes to construct a new, updated face transformation video, the system could automatically select the previously selected images by default. In this manner, a user who has already selected images for use in a previous video does not need to re-select images from previously reviewed time periods, and only new time periods that have not been reviewed yet could be examined.

Figure 8:
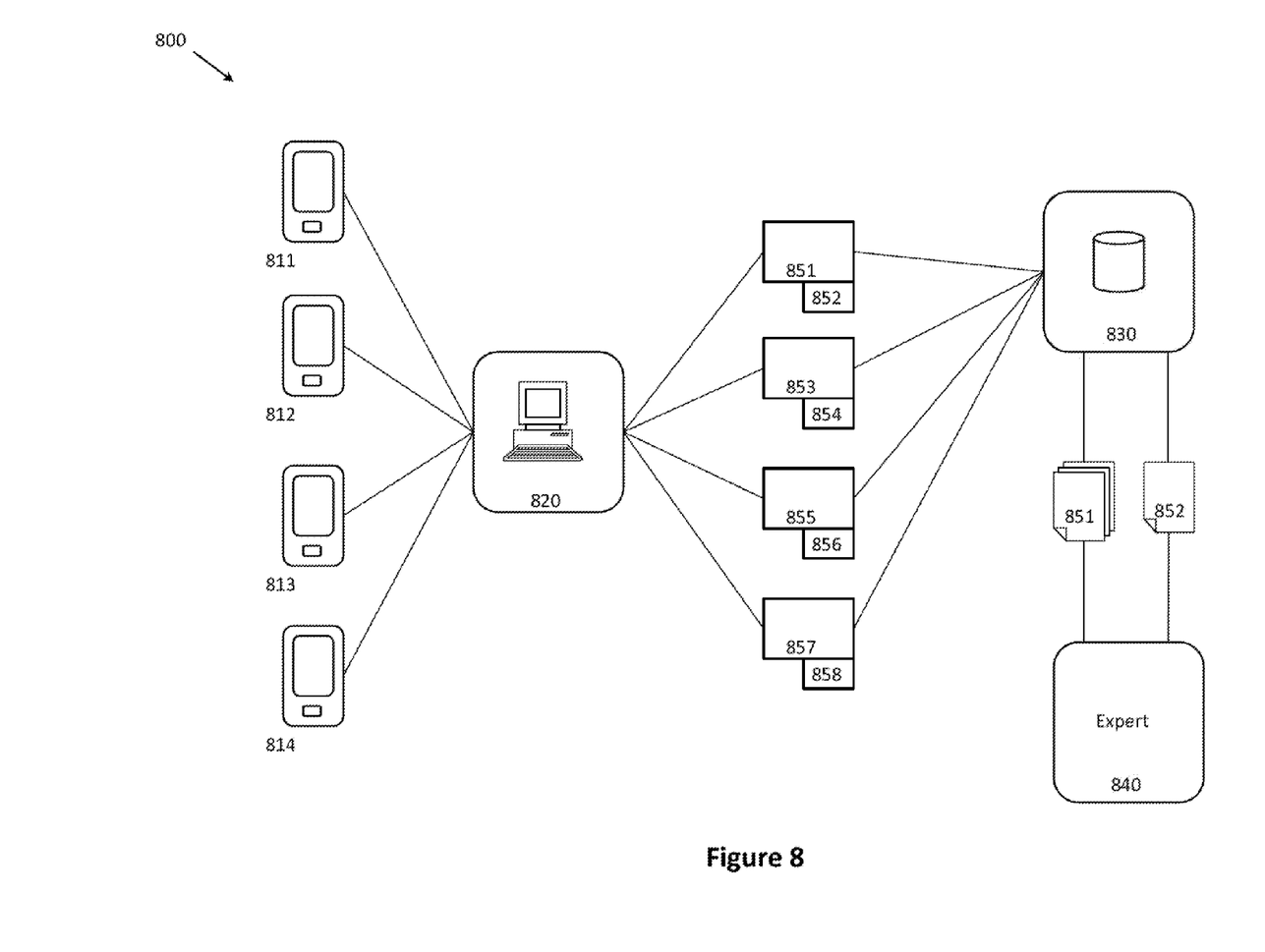
FIG. 8 is a software schematic showing component elements of a parental collaboration module.

In FIG. 8, a software schematic 800 for a parental collaboration module, such as parental collaboration module 360, has a computer interface connection 810, a comment storage interface 830, and an expert interface connection 840. Computer interface connection 810 communicates with a plurality of parental collaboration user interfaces such as user interface 811, user interface 812, user interface 813, and user interface 814, possibly via interface module 210. Each user interface 811, 812, 813, and 814 is preferably functionally coupled to computer interface connection 810 using a different parental user account. When a user of a parental user account submits a comment 851, metadata 852 about the parental user account and what comment thread the comment should be associated with is also saved. Here, the different user interfaces submit comment 851 having metadata 852, comment 853 having metadata 854, comment 855 having metadata 856, and comment 857 having metadata 858.

Computer interface connection 810 generally provides a parental collaboration user interface to each of user interfaces 811, 812, 813, and 814. A user from any user interface could send a comment generation request to the user interface, requesting the system to generate a comment thread. In some embodiments, comment threads are associated with a media file, such as any of the media files in a child's life album. When a user views the media file by navigating to the leaf of a life album, the user could also have access to contribute one or more comments to the child life album's comment thread. In such embodiments, the system preferably allows only a parent or guardian of the child's life album to generate a comment thread for the media file, and allows parents or guardians of a child's life album to set privacy permissions, allowing a subset of users to view a media file, and/or a subset of users to contribute to the comment thread associated with the media file. The system could be configured to automatically create a comment thread with every media file in a life album by default, allowing a parent of a child's life album to alter the defaults through a configuration user interface. For example, a parent could reset the system to automatically create comment threads for media files of a selected event, but not to automatically create comment threads for media files of unselected events.

A user could also send a request for the parental collaboration user interface to create a comment thread associated with a comment thread title topic, such as, "What is the best way for me to home school an autistic child?" Users could peruse a parental collaboration forum for such titles, and contribute comments to that comment thread. In some embodiments, the user who creates such a comment thread, could also set permissions allowing a selected subset of users to contribute comments to the comment thread. The system could allow users to define such a subset dynamically, for example a group of users who are defined by an admin user such as a homeschool group whose admin user controls which homeschool parents are allowed to be defined as a member of the homeschool group. Users within that group creating a comment thread through the parental collaboration user interface could then define the comment thread to only be accessed by members of the group. The system would generally hide a comment thread from users who do not have access to the comment thread, or could show the title of the comment thread, but not the contents of the comment thread to users who have not been given access by an admin user.

Once a comment thread has been created, users who have access to the comment thread are generally allowed to contribute comments, such as comments 851, 853, 855, and 857. Such comments are saved into a comment thread by comment storage interface 830. Comments could be in the form of text, audio, or video submissions. In order for the computer system to parse though audio or video submissions, the system preferably uses a voice recognition software to convert the content into parsable text, such as those disclosed in U.S. 2015/0012260 to Chakladar, U.S. Pat. No. 8,812,325 to Burns, U.S. Pat. No. 8,671,149 to Baxter, or U.S. Pat. No. 8,660,847 to Soemo, each of which is incorporated herein by reference.

Once two or more comments have been generated, the system preferably automatically derives one or more common issues for the comment thread. Common issues for the comment thread could be determined, for example, by detecting a recurring unquoted phrase among the comments. Since single words like "the" "and" and "or" tend to be commonly used among a plurality of different comments, the system preferably only automatically detects recurring unquoted phrases of a certain minimum length, such as three words, four words, five words, or more. The minimum length is typically predefined by an admin user of the system. As discussed previously, an "unquoted phrase" is a new phrase that has been generated by the comment submitter, as opposed to a phrase that was included as a quote by the comment submitter. Users that submit comments could be given the option to include a quote from a previous comment in order to give the new comment context. Such quotes are preferably excluded from analysis by the system.

In some embodiments, the system could be configured to only look for phrases that have been defined by an admin user through the parental collaboration user interface, such as "autistic child" or "ADHD." The parental collaboration user interface could also be configured to allow an admin user to define literal phrase equivalents, for example an admin user could draw an equivalent between the phrase, "ADHD," "Attention Deficit Disorder," and "Attention Deficit Hyperactivity Disorder." In some embodiments, a phrase might be an entire sentence and include a period, for example, "My child has nightmares." or "I wish I could sleep better at night." In some embodiments, a user could highlight a phrase in a comment field and submit it as an identified phrase that is a potential common issue. The system could then review the comment thread for recurrences of that identified phrase (and any literal equivalents defined by the system) to find how often that issue might have recurred in the comment thread.

The system could then review the list of detected common issues, and automatically select the common issue having the highest recurrence, and generate a comment thread summary as a function of the common issue. In some embodiments, an admin user might select the common issue to be summarized from a list of common issues presented to the admin user. Such a list could be filtered to only show the top common issues, or to only show common issues having a minimum recurrence (e.g. a minimum recurrence of 25, 50, 75, 100, or 150).

In a simple embodiment, such a summary could consist of only a list of the common issues with hyperlinks to the comment containing the common issue. In a preferred embodiment, the summary could consist of all of the literal equivalents along with a quantity next to each equivalent listing how many times that literal equivalent has been used. Such summaries preferably include hyperlinks to the comment to allow a user reviewing the summary to delve into the summary to find specific instances of the recurring issue to review.

Once a summary has been created, the system could then be configured to export the comment thread summary 851 of the most prominent common issue to an expert interface connection 840. Expert interface connection 840 transmits the comment thread summary to a remote expert computer system, which processes the comment thread summary and returns an answer 852 to be incorporated into the comment thread summary. An example of a preferred expert interface connection is an email that is automatically sent to the email address of a psychology expert who reviews the summary, generates a response that is entailed back to the expert interface connection 840 and the response 852 is then saved into the comment thread by comment storage interface 830.

In some embodiments, a comment thread summary is only generated and sent after a request for an expert answer has been requested by a user who has access to the comment thread. In other embodiments, a comment thread summary is only generated and sent after a threshold number of users have requested an expert answer through the parental collaboration user interface. For example, an admin could configure the system to only detect, summarize, and send a common issue to an expert when at least 10 users have sent a request for an expert answer through the parental collaboration user interface.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A non-transitory computer-readable medium for managing a plurality of child profiles, comprising instructions stored thereon, that when executed on a processor, perform the steps of:

associating a first plurality of media files with a first child profile of the plurality of child profiles, wherein the first plurality of media files comprise image media files and video media files, and wherein the first plurality of media files comprise timestamp metadata;

storing the first plurality of media files to a first life album memory;

automatically assigning a first time category and a second time category to each of the first plurality of media files as a function of the timestamp metadata;

receiving an assignment of an event name for each of the first plurality of media files from a life album user interface;

generating a first life album tree structure of the first plurality of media files as a function of the first time category, the second time category, and the event name of each of the first plurality of media files, wherein each of the first plurality of media files is represented by a different life album leaf of the first life album tree structure and wherein the first life album tree structure has at least three levels;

providing the first life album tree structure to the life album user interface navigating a first path in response to a first set of life album commands from the life album user interface, wherein first path travels through the first life album tree structure to a first life album leaf of the first life album tree structure, wherein the first life album leaf represents a first media file of the first plurality of media files;

navigating a second path in response to a second set of life album commands from the life album user interface, wherein the second path travels through the second life album tree structure to a second life album leaf of the first life album tree structure, wherein the second life album leaf represents a second media file of the first plurality of media files;

providing a first input comment field for the first media file and a second input comment field for the second media file to a media file view user interface, wherein each of the first input comment field and the second input comment field is configured to receive a video comment, an audio comment, and a text comment;

receiving a first input comment from the first input comment field and a second input comment from the second input comment field;

storing the first input comment and the second input comment to the first life album memory;

associating the first input comment with the first media file and the second input comment with the second media file;

providing a favorite toggle to the media file view user interface for each of the first media file and the second media file;

receiving a first favorite toggle command from the media file view user interface to toggle the first media file as a favorite of the first plurality of media files;

receiving a second favorite toggle command from the media file view user interface to toggle the second media file as a favorite of the first plurality of media files;

generating a favorites album tree structure as a function of a set of favorite toggled media files of the first plurality of media files, wherein the favorites album tree structure has (a) at least two levels, (b) an identifier of the first child profile as a first node, (c) an identifier of the toggled first media file as a first leaf of the first node (d) an identifier of the toggled second media file as a second leaf of the first node, (e) the first input comment associated with the first leaf, and (f) the second input comment associated with the second leaf; and providing the favorites album tree structure to a favorites user interface.

2. The non-transitory computer-readable medium claim 1, wherein the instructions are further configured to perform the steps of:

receiving a request from a modeling user interface to send the first media file to a distal modeling computer system;

transmitting the first media file to the distal modeling computer system for review;

receiving a purchase order for a license to the first media file;

debiting an account as a function of the purchase order; and transmitting a license to a modeling entity as a function of the purchase order.

3. The non-transitory computer-readable medium of claim 2, wherein the instructions are further configured to perform the steps of:

receiving a command from a competition user interface to send the first media file as an entry to a competition;

saving the first media file to a competition database having a plurality of competition media files, including the first media file;

providing the competition media files to a plurality of other competition user interfaces as entrants to the competition;

receiving a plurality of votes for a portion of the plurality of competition media files from the plurality of other competition user interfaces;

calculating a tally of votes for each of the plurality of competition media files; and providing an indicator of a winner of the competition to the competition user interface, wherein the indicator is calculated as a function of each of the tally of votes for each of the plurality of competition media files.

4. The non-transitory computer-readable medium of claim 3, wherein the instructions are further configured to perform the steps of:

receiving a command from a face transformation user interface to generate a face transformation video;

selecting a first facial image from the first plurality of media files as a function of the timestamp metadata;

selecting a second facial image from the first plurality of media files as a function of the timestamp metadata;

deriving a first set of facial features from the first facial image and a second set of facial features from the second facial image;

generating the face transformation video containing the first facial image and the second facial image that aligns the second facial image with the first facial image as a function of the first set of facial features and the second set of facial features;

saving the face transformation video to a face transformation memory location; and presenting the face transformation video to the face transformation user interface.

5. The non-transitory computer-readable medium of claim 4, wherein the instructions are further configured to perform the steps of:

generating a comment thread in response to a comment generation request from a parental collaboration user interface;

saving a first comment from a first parent of the first child profile to the comment thread;

saving a second comment from a second parent of a second child profile to the comment thread;

automatically deriving a first common issue among a plurality of comments saved to the comment thread;

generating a comment thread summary as a function of the first common issue;

exporting the comment thread summary to an expert user interface;

receiving an expert answer from the expert user interface;

saving the expert answer to an expert section of the comment thread, and presenting the expert answer to the parental collaboration user interface.

6. The non-transitory computer-readable medium of claim 5, wherein the step of automatically deriving a common issue comprises detecting a reclining unquoted phrase among the plurality of comments, wherein the recurring unquoted phrase has at least three words.

7. The non-transitory computer-readable medium of claim 6, wherein the recurring unquoted phrase has at least two literal phrase equivalents.

8. The non-transitory computer-readable medium of claim 5, wherein the instructions are further configured to perform the steps of automatically deriving a plurality of common issues among the plurality of comments, wherein the plurality of common issues includes the first common issue, and wherein the step of generating a comment thread summary comprises aggregating the plurality of common issues into a ranked list of common issues.

9. The non-transitory computer-readable medium of claim 5, further comprising receiving a notification from the parental collaboration user interface identifying a phrase as a potential common issue.

10. The non-transitory computer-readable medium of claim 4, wherein the step of selecting the first facial image from the first plurality of media files as a function of the timestamp metadata comprises:

selecting a first subset of images from the first plurality of media files, wherein each of the first subset of images has a timestamp within a first time period;

deriving a facial clarity value for each of the subset of images; and selecting the first facial image from the first subset of images as a function of its derived facial clarity value.

11. The non-transitory computer-readable medium of claim 10, wherein the step of selecting the first subset of images from the first plurality of media files comprises separating a video media file into a plurality of images for review.

12. The non-transitory computer-readable medium of claim 10, wherein the step of selecting the first subset of images from the first plurality of media files comprises:

identifying features of a child profile face in an image associated with the first child profile; and comparing the identified features against the first plurality of media files.

13. The non-transitory computer-readable medium of claim 10, wherein the step of selecting the first facial image from the first subset of images as a function of its derived facial clarity value comprises:
- selecting a second subset of images from the first subset of images wherein each of the second subset of images has a derived facial clarity value above a predefined threshold facial clarity value;
- providing the second subset of images to the face transformation user interface; and
- receiving a selection of the first facial image from the face transformation user interface.

14. The non-transitory computer-readable medium of claim 4, wherein the step of selecting the first facial image from the first plurality of media files as a function of the timestamp data comprises:
- selecting a first subset of images from the first plurality of media files, wherein each of the first subset of images has a timestamp within a first time period;
- providing the first subset of images to the face transformation user interface; and
- receiving a selection of the first facial image from the face transformation user interface.

15. The non-transitory computer-readable medium of claim 4, wherein the instructions are further configured to perform the step of receiving a first time period and a second time period from the face transformation user interface,
- wherein the step of selecting the first facial image from the first plurality of media files as a function of the timestamp metadata comprises selecting the first facial image from a first subset of images having a timestamp within the first time period, and
- wherein the step of selecting the second facial image from the second plurality of media files as a function of the timestamp metadata comprises selecting the second facial image from a second subset of images having a timestamp within the second time period.

16. The non-transitory computer-readable medium of claim 4,
- wherein the first set of facial features comprise a first nose location,
- wherein the second set of facial features comprise a second nose location, and
- wherein aligning the second facial image with the first facial image comprises aligning the second nose location to overlap the first nose location.

17. The non-transitory computer-readable medium of claim 4,
- wherein the first set of facial features comprises a first angle of a first face in the first facial image,
- wherein the second set of facial features comprises a second angle of a second face in the second facial image, and
- wherein aligning the second facial image with the first facial image comprises aligning the second facial angle with the first facial angle.

* * * * *